US010307812B2

(12) United States Patent
Zulauf et al.

(10) Patent No.: US 10,307,812 B2
(45) Date of Patent: Jun. 4, 2019

(54) TRANSFER DEVICE FOR A WORKPIECE (71) Applicant: Guedel Group AG, Langenthal (CH)

(72) Inventors: Walter Zulauf, Ursenbach (CH);
Dominique Schaer, Basel (CH);
Markus Gerber, Niederoenz (CH)

(73) Assignee: GUEDEL GROUP AG, Langenthal (CH)

( * ) Notice: Subject to any disclaimer, the term of this patent is extended or adjusted under 35 U.S.C. 154(b) by 735 days.

(21) Appl. No.: 14/909,251

(22) PCT Filed: Aug. 16, 2013

(86) PCT No.: PCT/CH2013/000142
§ 371 (c)(1),
(2) Date: Feb. 1, 2016

(87) PCT Pub. No.: WO2015/021564
PCT Pub. Date: Feb. 19, 2015

(65) Prior Publication Data
US 2016/0184879 A1   Jun. 30, 2016

(51) Int. Cl.
*B21D 43/05* (2006.01)
*B21J 11/00* (2006.01)
(Continued)

(52) U.S. Cl.
CPC ............ *B21D 43/05* (2013.01); *B21D 43/105* (2013.01); *B21J 11/00* (2013.01); *B65G 47/34* (2013.01);
(Continued)

(58) Field of Classification Search
CPC .... B21D 43/05; B21D 43/105; B65G 47/902; B65G 47/34; B65G 47/912; B21J 11/00
(Continued)

(56) References Cited

U.S. PATENT DOCUMENTS 3,902,606 A * 9/1975 Ronbeck .............. B21D 43/105
414/733
4,411,587 A * 10/1983 Niki ........................ B21D 43/05
100/207

(Continued)

FOREIGN PATENT DOCUMENTS

DE          19851746 A1     5/2000
DE      102006003522 A1     8/2007
(Continued)

*Primary Examiner* — David B Jones
(74) *Attorney, Agent, or Firm* — Birch, Stewart, Kolasch & Birch, LLP (57) ABSTRACT

The present invention relates to a transfer device (1) for a workpiece (11), said transfer device including a frame (2) as well as a first pivot arm (3). The first pivot arm (3) is connected to the frame (2) so as to be pivotable by means of a first rotational axis (6). Furthermore, a first slide (9) is mounted so as to be linearly displaceable on the first pivot arm (3). The transfer device (1) further includes a holding device (10) for a workpiece (11) which is connected to the first slide (9) so as to be rotatable relative to the pivot arm (3) by means of a third rotational axis (12). The first pivot arm (3) is connected to the frame (2) so as to be rotatable in a second region by means of a second rotational axis (13) which is mounted on the frame (2) so as to be displaceable substantially in the horizontal direction.

16 Claims, 4 Drawing Sheets

(51) Int. Cl.
  *B65G 47/91* (2006.01)
  *B21D 43/10* (2006.01)
  *B65G 47/34* (2006.01)
  *B65G 47/90* (2006.01)

(52) U.S. Cl.
  CPC ......... *B65G 47/902* (2013.01); *B65G 47/912* (2013.01)

(58) Field of Classification Search
  USPC ...................................... 72/405.09
  See application file for complete search history.

(56) References Cited

U.S. PATENT DOCUMENTS

| | | | | |
|---|---|---|---|---|
| 4,530,637 | A * | 7/1985 | Mason | B65G 47/912 |
| | | | | 198/468.4 |
| 4,574,941 | A * | 3/1986 | Tsuge | B21D 43/105 |
| | | | | 198/468.2 |
| 6,394,740 | B1 * | 5/2002 | Derby | B25J 9/042 |
| | | | | 414/744.1 |
| 7,128,198 | B2 | 10/2006 | Yoshida et al. | |
| 7,650,774 | B2 * | 1/2010 | Kato | B21D 43/05 |
| | | | | 72/405.01 |
| 2008/0085178 | A1 | 4/2008 | Baba | |

FOREIGN PATENT DOCUMENTS

| | | |
|---|---|---|
| DE | 102012009108 A1 | 10/2012 |
| JP | 2011-31268 A | 2/2011 |

\* cited by examiner

TRANSFER DEVICE FOR A WORKPIECE

TECHNICAL SCOPE

The invention relates to a transfer device, in particular for transferring workpieces between tools of two adjacent presses as well as to an arrangement with at least one first press and at least one second press as well as a transfer device.

PRIOR ART

These types of transfer devices and are arrangements are known:

DE 10 2012 009 108 A1 (Aida Engineering Ltd.) discloses a transfer device with a frame and a first pivot arm which is mounted so as to be pivotable relative to the frame. The first pivot arm is movable back and forth in relation to the frame by means of a drive. A second pivot arm, which is mounted so as to be pivotable in relation to the first pivot arm and movable in the longitudinal direction of the same, is attached on the first pivot arm. A holding device for a tool is pivotably mounted on an end of the second pivot arm.

U.S. Pat. No. 7,128,198 (Komatsu Ltd.) describes a transfer device with a pivot element, a cross carrier being fastened on said pivot element so as to be movable by means of a linear movement mechanism. A workpiece holding device is mounted on the cross carrier. The pivot element is driven in an oscillating manner, the relative spacing between the center of the oscillation of the pivot element and the cross carrier being variable by means of the linear movement mechanism.

DE 198 51 746 A1 (Schuler Pressen GmbH & Co.) discloses a transfer device for transferring workpieces in multistage presses. The transfer device has a controllable workpiece holding means as well as gearing with a pivot arm which is connected to the workpiece holding means. The pivot axis of the pivot arm, in this case, is oriented deviating from the vertical, in particular is at right angles with respect to said vertical.

The disadvantage of the previously known transfer devices is that on account of their kinematics they only allow workpieces to be transferred at a limited speed.

REPRESENTATION OF THE INVENTION

It is the object of the invention, accordingly, to create a transfer device which is associated with the technical scope mentioned in the introduction, enables workpieces to be transferred efficiently and rapidly, at the same time, is designed in as simple a manner as possible.

The achievement of the object is defined by the features of claim 1. According to the invention, the transfer device includes a frame and a first pivot arm with a first end and a second end. The pivot arm is connected to the frame at the first end so as to be pivotable by means of a first rotational axis. The transfer device has a first slide which is arranged so as to be linearly displaceable on the pivot arm along a first linear axis. A holding device for a workpiece is connected to said slide so as to be rotatable by means of a third rotational axis. In addition, a second rotational axis, which is mounted so as to be substantially horizontally displaceable, is arranged on the frame, wherein the pivot arm is connected to said second rotational axis so as to be rotatable in a region which is located in the direction of the second end from the first end.

The transfer device according to the invention is suitable, in particular, for transferring workpieces between tools of two adjacent presses, the workpiece not needing to be put down in between. A transfer device of this type is used preferably in multistage presses where workpieces are processed in several forming steps. For example, bodywork parts are produced from flat metal sheets in several consecutive press steps. To this end, bodywork presses comprises several press stages between which the workpieces have to be moved.

The frame forms a base unit on which the further parts of the transfer device are mounted. The frame, in this case, can be of any suitable form and size. In particular, the frame is fastenable in a stationary manner above the workpieces of the presses. As an alternative to this, the frame can be realized as a travelling trolley or slide in order to be able to be arranged so as to be movable on a corresponding carrier or rail between two presses. In addition, the frame can also be arranged so as to be pivotable between presses. Furthermore, more than only one device according to the invention can also be arranged on the same frame.

A "rotational axis" within the framework of said application is to be understood as an axis about which a certain component of the device is rotatable or pivotable. The rotational axis can be actively driven or can also just be passive.

A "linear axis" within the framework of said application is to be understood as an axis along which a component of the device is linearly displaceable.

"So as to be displaceable substantially in the horizontal direction" means within the framework of said application that the second rotational axis is movable in a direction which is at right angles to the effective direction of gravity. Said movement is preferably effected in a linear manner. As an alternative to this, however, it can also be provided that said movement is carried out in an arcuate manner. The second rotational axis is guided correspondingly along the frame, for example by means of a guide rail or a guide groove.

The first slide is guided in a linear manner along the first pivot arm in particular by means of at least one rail or at least one guide groove. These types of linear guides are known to an expert in the field.

So-called suction bridges, which are realized by a cross carrier with suction means arranged thereon, are used, in particular, as a holding device. An expert in the field is also appropriately familiar with these types of suction bridges. Other holding means can also be used as an alternative to this, such as, for example, electromagnets or grippers. The type of holding means can be adapted accordingly in dependence on the type of workpieces to be transferred.

In the case of the arrangement according to the invention, the first pivot arm is connected to the frame by means of two rotational axes. In this case, it is possible to guide the pivoting movement of the pivot arm in a precise and rigid manner by means of the two rotational axes. Furthermore, the lever action on the first pivot arm can also be reduced.

It is also possible for the holding device to achieve a high level of acceleration in the case of the device according to the invention such that the time required for transferring a workpiece from one press to the other is able to be reduced.

The first rotational axis is preferably arranged so as to be displaceable in a substantially vertical direction relative to the frame.

"So as to be displaceable in a substantially vertical direction" means within the framework of the present application that the first rotational axis is movable both upward and downward in a direction which corresponds substantially to the effective direction of gravity. The movement, in this case, is preferably linear, but in a particularly preferred embodiment can also be effected in an arcuate manner, i.e. the movement has both a vertical and a horizontal component. In an especially preferred manner, the movement is effected in the form of a circular arc or a segment of a circular arc.

This makes it possible for the device to be developed in a particularly simple manner as the first pivot arm does not have to be realized as a telescopic arm in order to make the pivoting movements possible. As an alternative to this, the first rotational axis can also be mounted rigidly on the frame and the first pivot arm can be arranged so as to be displaceable in the longitudinal direction relative to the second rotational axis. As an alternative to this, a combination of the two embodiments can also be used, that is to say a first rotational axis which is substantially vertically displaceable and a first pivot arm which is mounted so as to be displaceable in the longitudinal direction relative to the second rotational axis.

In a preferred manner, the first rotational axis and the second rotational axis are arranged parallel to one another. As a result, the movement of the first pivot arm is effected in a plane which, in particular in a preferred manner, is aligned substantially vertically, i.e. in the effective direction of gravity.

The first pivot arm is preferably mounted so as to be rotatable relative to a second pivot arm by means of the first rotational axis. In this case, the second pivot arm is mounted on the frame so as to be rotatable by means of a fourth rotational axis, wherein the fourth rotational axis is parallel to the first rotational axis.

As a result of said arrangement, the substantially vertical displacement of the first rotational axis can be realized by two simply developed rotational axes, in terms of an eccentric, the two rotational movements of the rotational axes being converted into a translatory movement of the first pivot arm. As, in the case of said embodiment, no linear guide and no linear drive has to be provided for the vertical displacement of the first rotational axis, the device according to the invention is able to be designed in a relatively simple manner. In addition, as a result, the dimension of the frame is able to be reduced as a considerably shorter second pivot arm can be used instead of a relatively long linear bearing. For example, a linear bearing with a length of 1100 mm can be replaced by a second pivot arm with a length of just 300 mm.

The fourth rotational axis is realized in a preferred manner as planetary gearing which is driven by a servomotor. As an alternative to this, the fourth rotational axis can comprise a torque motor. The second pivot arm can be driven in a particularly simple and efficient manner by means of said arrangement. As an alternative to this, however, the fourth rotational axis can also be realized in another manner, e.g. as a roller bearing for a shaft which is driven by a motor.

The first rotational axis is preferably realized as a roller bearing, in particular as a ball bearing. Roller bearings are simple and favorable to produce. Furthermore, they have a low level of wear. As a result, the device according to the invention can be produced in a sturdy and cost-efficient manner. As an alternative to this, however, the first rotational axis can also be realized in another manner, e.g. as a slide bearing. Furthermore, the first rotational axis could also include gearing, for example planetary gearing.

The first rotational axis preferably does not have a drive. A pivoting movement of the first pivot arm is consequently effected purely by means of the linear displacement of the second rotational axis. This makes it possible for the transfer device to be developed in a simple manner as well as for the movement of the first pivot arm to be controlled in a precise and rigid manner.

In a particularly preferred manner, the drive of the first pivot arm is effected by means of a coordinated movement of the second and of the fourth rotational axis, the first rotational axis being entrained in a passive manner. This makes it possible for the first pivot arm to be guided in a very precise, rigid manner with the transfer device developed at the same time in a simple mechanical manner.

In a particularly preferred manner, the second rotational axis is arranged on a second slide which is movable relative to the frame in a substantially horizontal direction along a second linear axis by means of at least one linear drive.

This makes it possible to guide the substantially horizontal movement of the second rotational axis in a precise manner. The second rotational axis is developed in a particularly preferred manner as a roller bearing which is arranged on the slide. As an alternative to this, the second rotational axis can also be developed as robot gearing.

The second slide is preferably guided along a preferably linear path on corresponding rails or a guide groove. A pulley, a threaded rod or a hydraulic or pneumatic cylinder can be used, for example, as the linear drive.

In an especially preferred manner, the second slide is movable relative to the frame by means of two linear drives which are preferably independent of one another. The use of two independent linear drives enables high redundancy of the system. In addition, the movement of the first pivot arm is able to be controlled very well with two linear drives, it being possible to prevent unintentional pivoting movements of the first pivot arm, which can be triggered by the own weight of the first pivot arm, in a more efficient and reliable manner by two drives than would be possible with only one linear drive.

In a particularly preferred manner, however, at least one toothed belt, which is driven by means of a servomotor, is used as the linear drive of the second slide. By using a toothed belt in conjunction with a servomotor, it is possible to control the translatory movement of the second slide in a very precise manner. In addition, expenditure on servicing and repairing such a development is relatively low. Furthermore, as a result, the drive is able to be displaced onto the frame by the second slide, whereupon the weight to be moved of the second slide can be reduced.

When using two toothed belts as the drive of the second slide, both toothed belts preferably have at least one common shaft, on which at least one safety brake acts. By providing one common shaft as well as one additional safety brake, an unintentional pivoting movement of the first pivot arm can be reliably prevented, which increases the overall safety of the transfer device according to the invention.

The holding device is preferably arranged so as to be rotatable by means of the third rotational axis on a third pivot arm which is mounted on the first pivot arm so as to be rotatable by means of a fifth rotational axis, wherein the third rotational axis and the fifth rotational axis are parallel to the first rotational axis.

The transfer device achieves greater flexibility as a result of the third pivot arm as the additional pivot arm lends an additional degree of freedom to the device. As a result, the holding device is able to be positioned better in the tools of presses in order to grip workpieces. As an alternative to this, a transfer device according to the invention can have even more pivot arms which are arranged in an articulated manner between the third pivot arm and the holding device.

In a preferred manner, the third rotational axis is realized as robot gearing. In a further preferred manner, the robot gearing is driven by means of a servomotor.

Robot gearing driven by a servomotor enables the movement of the third pivot arm to be controlled in a precise manner such that the holding device of the transfer device according to the invention is able to be positioned in as precise a manner as possible above a workpiece to be transferred and is then able to deposit said workpiece in a precise manner into a tool of a further press. In addition, a workpiece is able to be raised actively on one side when being deposited into a tool of a press in order to facilitate the depositing.

In a preferred manner, the holding device is mounted so as to be pivotable relative to the third pivot arm by means of a sixth rotational axis which is substantially at right angles to the third rotational axis.

As a result, the orientation of the holding device can be modified additionally in a second plane. This enables workpieces to be gripped efficiently by the holding device as the orientation thereof can be adapted to workpieces which comprise a top surface which is not parallel with the horizontal plane. This increases the flexibility when using a transfer device according to the invention.

The first slide is preferably drivable by means of at least one linear drive. This enables as simple and nevertheless efficient a drive of the first slide as possible. In a particularly preferred manner, the first slide is driven by means of a toothed belt and a servomotor. As an alternative to this, however, the first slide can also by driven by another linear drive, e.g. by means of a pulley, a threaded rod, etc.

The present invention further relates to an arrangement including at least one first press and at least one second press which are provided with tools for pressing workpieces, as well as at least one transfer device according to the invention. The at least one transfer device is arranged in such a manner between the at least one first press and the at least one second press that a workpiece is able to be transferred from the tool of the at least one first press to the tool of the at least one second press without the workpiece being deposited in between.

As a result of the arrangement according to the invention, workpieces are able to be transferred in a particularly efficient and reliable manner from one tool of a first press to a tool of a second press. The transfer device is preferably arranged rigidly between the two presses. As an alternative to this, the device can also be arranged so as to be movable between the two presses, it being mounted, for example, on a slide on a guide rail which is arranged above the tools of the presses. As an alternative to this, however, the transfer device can also be arranged on a wagon or slide which is movable along a guide rail or a guide groove on the floor.

Further advantageous embodiments and feature combinations of the invention are produced from the following description of the detail and from the entirety of the patent claims.

BRIEF DESCRIPTION OF THE DRAWINGS

The drawings used to explain the exemplary embodiment are as follows.

In principle, identical parts are provided with identical references in the figures.

WAYS TO REALIZE THE INVENTION

Figure 1:
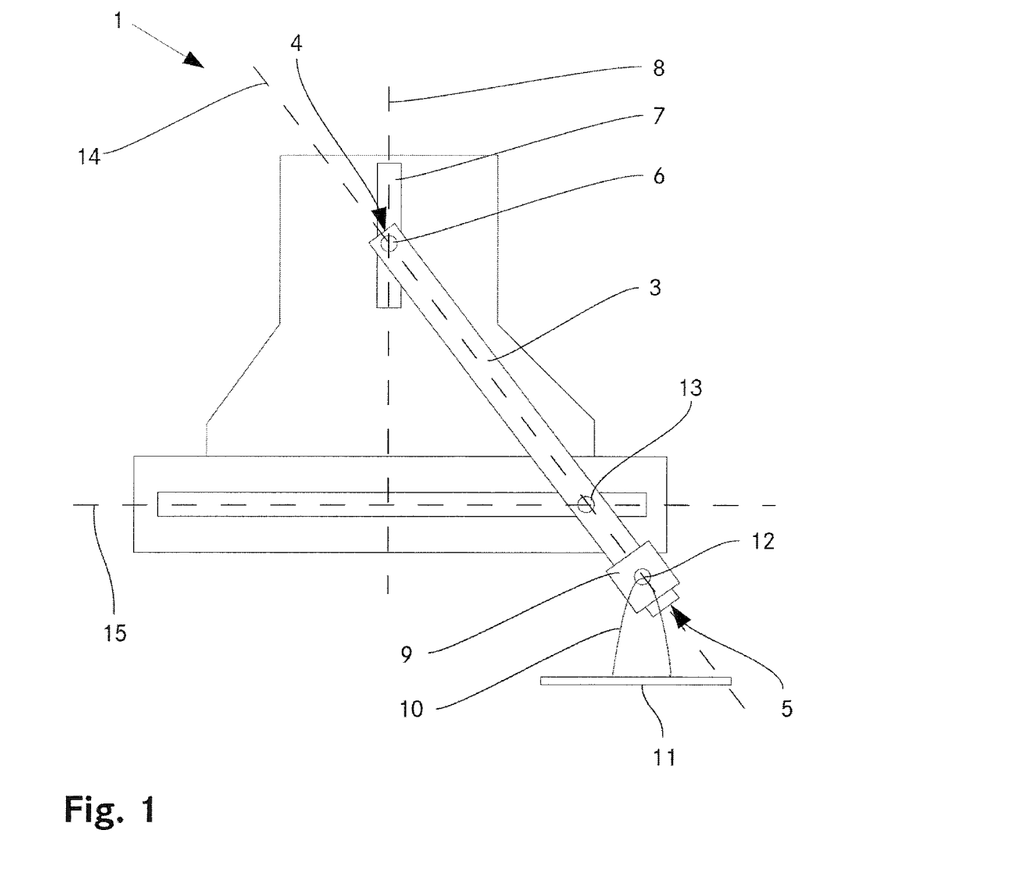
FIG. 1 shows a schematic representation of a first embodiment of a transfer device according to the invention.

FIG. 1 shows a schematic representation of a first embodiment of a transfer device 1 according to the invention. The transfer device 1 includes a frame 2 as well as a first pivot arm 3. The first pivot arm 3 is connected to the frame 2 so as to be pivotable by means of a first rotational axis 6, the first rotational axis 6 being situated in the region of a first end 4 of the first pivot arm 3. The first rotational axis 6 is mounted so as to be displaceable in the horizontal direction along a first linear axis 8 by means of a first linear guide 7.

A first slide 9, which is displaceable in a linear manner along a second linear axis 14, is mounted on the first pivot arm 3. The second linear axis 14 is situated on the first pivot arm 3 and is moved in a corresponding manner together with said pivot arm. The first slide 9 has a suitable drive in order to enable linear displacement along the second linear axis 14 on the first pivot arm 3. A holding device 10 is connected to the first slide 9 so as to be rotatable by means of a third rotational axis 12. The holding device 10 is suitable for gripping workpieces 11. The holding device 10 typically includes so-called suction bridges.

In a region which, when viewed from the first end 4 is located in the direction of the second end 5 of the first pivot arm 3, the first pivot arm is connected to a second rotational axis 13 which is mounted on the frame 2 so as to be displaceable in the horizontal direction along a third linear axis 15. The second rotational axis 13 is movable along the third linear axis 15 relative to the frame 2 by means of a first linear drive 21. By displacing the second rotational axis 13 along the third linear axis 15, the first pivot arm 3 can be pivoted relative to the frame 2. At the same time as the horizontal displacement of the second rotational axis 13, the first pivot arm is rotated about the second rotational axis 13 and pivoted about the first rotational axis 6. As the second rotational axis 13 is arranged fixedly on the first pivot arm 3, at the same time the first rotational axis 6 is also displaced horizontally along the first linear guide 7.

By rotating the third rotational axis 12 in a coordinated manner, a workpiece 11 mounted on the holding device 10 can be held in a constant alignment in space. The third rotational axis 12, in this case, is provided with a drive (not shown) in order to enable an active rotation of the holding device 10.

In addition, as a result of displacing the first slide 9 in a coordinated linear manner along the first pivot arm 3 during a pivoting movement, the spacing between a workpiece 11 that is gripped by the holding device 10 and the frame 2 can be held constant, i.e. the workpiece 11 performs a substantially rectilinear translatory movement during the pivoting movement of the first pivot arm 3. As an alternative to this, the workpiece 11 can naturally also be moved during the pivoting movement, for example, in the direction of the first end 4 of the first pivot arm 3, if this were to be necessary.

In principle, just the displacement of the second rotational axis 13 along the third linear axis 15 is enough to enable the first pivot arm 3 to pivot, i.e. the first rotational axis 6 and the second rotational axis 13 do not need a drive. The vertical movement of the first rotational axis 6 along the first linear axis 8 does not require a drive either. However, for better load distribution and for better control of the movement sequence, the first rotational axis 6 is also preferably provided with a drive.

Figure 2:
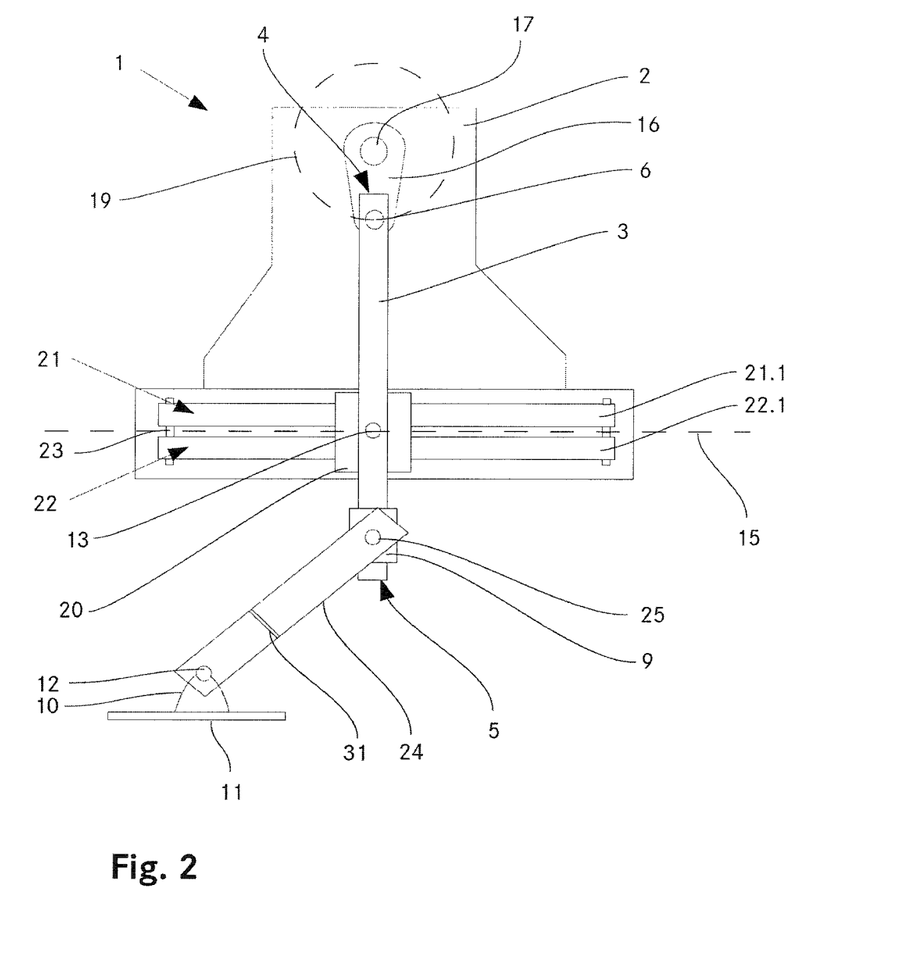
FIG. 2 shows a schematic representation of a second embodiment of a transfer device according to the invention.

FIG. 2 shows a second embodiment of the transfer device 1 according to the invention. In the case of said embodiment, the first pivot arm 3 is connected to a second pivot arm 16 so as to be pivotable by means of the first rotational axis 6 and said second pivot arm 16 is arranged on the frame 2 so as to be rotatable by means of a fourth rotational axis 17. The fourth rotational axis 17 is arranged parallel to the first pivot axis 6. The second pivot arm 16, in this case, acts as an eccentric, by way of which the first rotational axis 6 can be moved along a circular path 19 around the fourth rotational axis 17. As a result, on the one hand it is possible to displace the first rotational axis 6 in a vertical manner, on the other hand it is also possible to displace it in a horizontal manner. Preferably only the fourth rotational axis 17, which can be developed as planetary gearing, is driven by means of a servomotor, whilst the first rotational axis 6 is entrained in a passive manner.

The second rotational axis 13 is arranged on a second slide 20 in the case of said embodiment of the invention. The second slide 20 is displaceable in the horizontal direction along the third linear axis 15 by means of two linear drives 21, 22. The second slide 20 can be mounted, in particular, on rails. In the exemplary embodiment shown, the two linear drives, 21, 22 include two toothed belts 21.2, 22.1 as well as two servomotors (not shown). By using two independent linear drive 21, 22, a certain redundancy can be achieved. In addition, the load can also be distributed to two motors, as result of which said motors are able to be developed in a smaller manner.

The two toothed belts run on a common shaft 23, on which a common safety brake (not shown) acts. Safety when the transfer device 1 is operating can be increased as a result as the pivoting movement of the first pivot arm 3 is able to be stopped in a rapid and reliable manner.

The holding device 10 is rotatably connected to a third pivot arm 24 by means of the third rotational axis 12. The third pivot arm 24, in turn, is arranged on the first slide 9 so as to be pivotable by means of a fifth rotational axis 25. In addition, the third pivot arm 25 has a sixth rotational axis 31 which is at right angles to the third rotational axis 12. As a result, the holding device 10 can be rotated in an additional plane. As a result of said additional third pivot arm 25 as well as the sixth rotational axis 31, the transfer device 1 gains overall in degrees of freedom, which enables more flexible use.

An expert will recognize that individual elements of the embodiment of FIG. 2 can be used with the embodiment of FIG. 1. Thus, for example, the second pivot arm 16 can be used on a transfer device 1 with only one linear drive 21.

Figure 3:
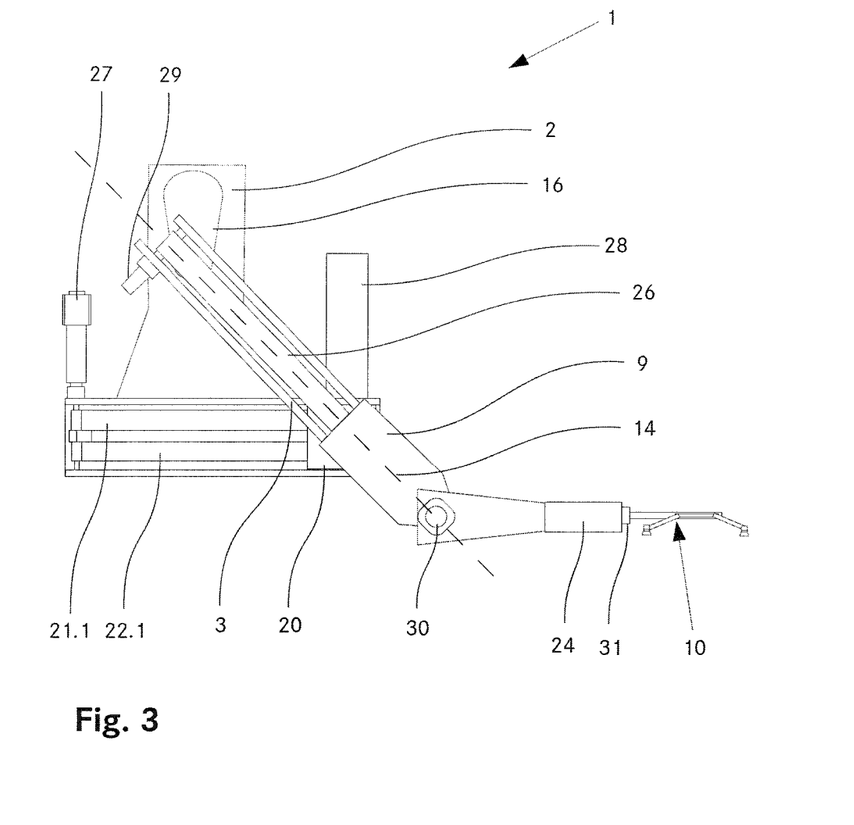
FIG. 3 shows a perspective representation of the embodiment according to FIG. 2.

FIG. 3 shows a view of the embodiment of the transfer device 1 of FIG. 2. The different servomotors 27, 28, 29, 30, which serve for driving the different components, can be seen well in said figure. A first servomotor 27 drives the first toothed belt 21.1. A second servomotor 28 serves for driving the second toothed belt 22.1. The first slide 20 can be moved in the horizontal direction in relation to the frame 2 by means of the two toothed belts 21.1, 22.1.

A third servomotor 29 drives a third toothed belt 26 which serves as the linear drive for displacing the first slide 9 along the second linear axis 14 on the first pivot arm 3. Finally, the third pivot arm 24 can be pivoted in relation to the first slide 9 by means of a fourth servomotor 30. The fifth rotational axis 25, which is covered in the representation by the fourth servomotor 30, is preferably realized in this case as robot gearing. Furthermore, the holding device 10 and the sixth rotational axis 31 also have at least one drive (not shown) in order to be able to rotate the holding device 10 in two planes in relation to the third pivot arm 24.

Figure 4:
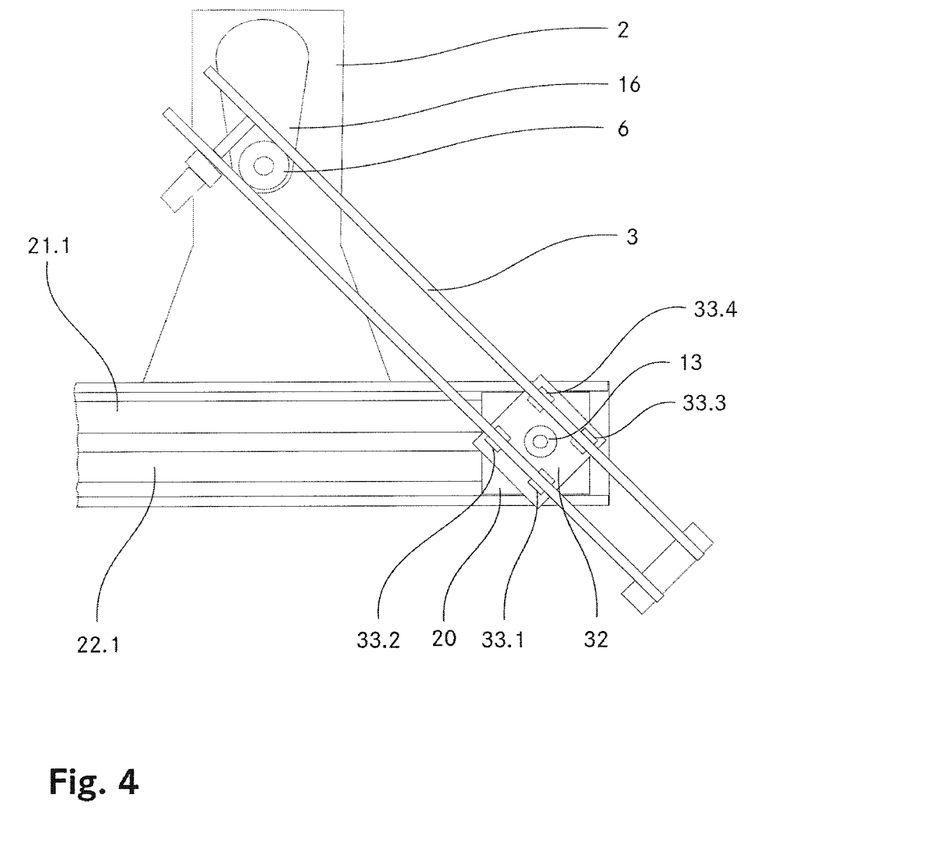
FIG. 4 shows an elevation of the first pivot arm of the embodiment according to FIG. 3.

FIG. 4 shows an elevation of the first pivot arm 3 of the embodiment according to FIG. 3. The second pivot arm 16, which is connected to the first pivot arm 3 so as to be rotatable in relation to the frame 2 and pivotable by means of the first rotational axis 6, can be seen well. In addition, the development of the second slide 20 can be seen well. A platform 32 is connected to the second slide 20 so as to be rotatable by means of the second rotational axis 13. The first pivot arm 3 is mounted on the platform 32 so as to be displaceable by means of four sliding bearing 33.1, 33.2, 33.3, 33.4. As a result of said development, the first pivot arm 3 is able to be both rotated and displaced in relation to the second slide 20. As a result, the length of the second pivot arm 16 can be shortened since, as a result of the displacement of the first pivot arm 3 relative to the second slide 20, it is possible to compensate for part of the necessary vertical displacement of the first rotational axis 6.

The invention claimed is:

1. A transfer device for a workpiece, in particular for transferring workpieces between tools of two adjacent presses, said transfer device including:
   a) a frame;
   b) a first pivot arm with a first end and a second end;
   c) a first slide which is arranged on the pivot arm so as to be linearly displaceable along a second linear axis;
   d) a holding device for a workpiece which is connected to the first slide so as to be rotatable relative to the pivot arm by means of a third rotational axis;
   e) a second rotational axis which is mounted on the frame so as to be displaceable substantially in the horizontal direction, wherein the pivot arm is connected to the second pivot axis so as to be rotatable in a region which is located in the direction of the second end from the first end;
   wherein the transfer device further includes a second pivot arm, the first end of s id first pivot arm being connected rotatably to said second pivot arm by means of a first rotational axis;
   and wherein said second pivot arm is rotatably connected to the frame by means of a fourth rotational axis.

2. The transfer device as claimed in claim 1, wherein the first rotational axis is mounted so as to be displaceable substantially in the vertical direction relative to the frame.

3. The transfer device as claimed in claim 1, wherein the first rotational axis and the second rotational axis are parallel to one another.

4. The transfer device as claimed in claim 1, wherein the fourth rotational axis is a planetary gearing which is driven by a servomotor, or is a torque motor.

5. The transfer device as claimed in claim 1, wherein the first rotational axis is a roller bearing.

6. The transfer device as claimed in claim 1, wherein the first rotational axis does not have a drive.

7. The transfer device as claimed in claim 1, wherein the transfer device further comprises a second slide and at least one linear drive, the second rotational axis being arranged on a said second slide and said second slide being movable by means of the at least one linear drive in a substantially horizontal direction along a third linear axis relative to the frame.

8. The transfer device as claimed in claim 7, wherein the transfer device further comprises two independent linear drives, the second slide being movable relative to the frame by means of said two independent linear drives.

9. The transfer device as claimed in claim 7, wherein each of the at least one linear drives comprises a toothed belt and a drive motor.

10. The transfer device as claimed in claim 9, wherein said transfer device comprises at least one common shaft on which said toothed belts run, said transfer device further comprising a safety brake which acts on said at least one common shaft.

11. The transfer device as claimed in claim 1, wherein said transfer device further comprises a third pivot arm which is mounted rotatably on said first pivot arm by means of a fifth rotational axis, said holding device being arranged rotatably on said third pivot arms by means of the third rotational axis, wherein the third rotational axis and the fifth rotational axis are parallel to the first rotational axis.

12. The transfer device as claimed in claim 11, wherein the holding device is rotatably connected to the third pivot arm by means of a sixth rotational axis which is substantially at right angles to the third rotational axis.

13. The transfer device as claimed in claim 1, wherein said transfer device comprises at least one linear drive, said first slide being drivable by means of said at least one linear drive.

14. An arrangement including at least one first press and at least one second press which are provided with tools for pressing workpieces, as well as at least one transfer device as claimed in claim 1, wherein the at least one transfer device is arranged in such a manner between the at least one first press and the at least one second press that a workpiece is able to be transferred from the tool of the at least one first press to the tool of the at least one second press without the workpiece being deposited in between.

15. The transfer device as claimed in claim 1, wherein the fourth rotational axis is parallel to the first rotational axis.

16. The transfer device as claimed in claim 5, wherein the roller bearing is a ball bearing.

\* \* \* \* \*